US011632404B2

United States Patent
Cox et al.

(10) Patent No.: US 11,632,404 B2
(45) Date of Patent: Apr. 18, 2023

(54) DATA STREAM PRIORITIZATION FOR COMMUNICATION SESSION

(71) Applicant: Microsoft Technology Licensing, LLC, Redmond, WA (US)

(72) Inventors: Landon Prentice Cox, Seattle, WA (US); Yu Yan, Bellevue, WA (US); Shadi Abdollahian Noghabi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/363,434

(22) Filed: Jun. 30, 2021

(65) Prior Publication Data

US 2023/0007056 A1 Jan. 5, 2023

(51) Int. Cl.
*H04L 65/1066* (2022.01)
*H04L 65/80* (2022.01)
*H04L 65/403* (2022.01)

(52) U.S. Cl.
CPC ........ *H04L 65/1066* (2013.01); *H04L 65/403* (2013.01); *H04L 65/80* (2013.01)

(58) Field of Classification Search
CPC .......... H04L 29/06; H04N 7/15; H04N 7/152; H04N 7/147
USPC ............................................ 348/14.01–14.16
See application file for complete search history.

(56) References Cited

U.S. PATENT DOCUMENTS

| | | | |
|---|---|---|---|
| 9,706,171 B1 * | 7/2017 | Riley | H04N 7/147 |
| 9,924,136 B1 * | 3/2018 | Faulkner | G06T 13/80 |
| 2012/0026277 A1 * | 2/2012 | Malzbender | H04N 7/147 348/E7.083 |
| 2017/0155870 A1 | 6/2017 | Zetterlund et al. | |
| 2021/0076002 A1 | 3/2021 | Peters et al. | |

FOREIGN PATENT DOCUMENTS

WO    WO-2021031575 A1 *  2/2021

OTHER PUBLICATIONS

"International Search Report and Written Opinion Issued in PCT Application No. PCT/US22/029730", dated Jul. 29, 2022, 19 Pages.

* cited by examiner

*Primary Examiner* — Melur Ramakrishnaiah

(57) ABSTRACT

A method for data stream prioritization by a session controller is described. Usage data associated with a video communication session is received for one or more client devices of the video communication session. The usage data is based on content within data streams of the video communication session. A first client device of the one or more client devices is identified as having a higher priority level during the video communication session based on the usage data. Instructions are sent to the first client device during the video communication session causing the first client device to improve a quality of a first data stream generated by the first client device for the video communication session.

19 Claims, 7 Drawing Sheets

DATA STREAM PRIORITIZATION FOR COMMUNICATION SESSION

BACKGROUND

Communication systems such as video-conferencing systems often balance interactivity and scale among participants of a video conference or other communication session. When a communication session has relatively few participants (e.g., less than 25), a relatively small number of media servers may forward video streams of each participant to every other participant. However, as the number of participants grows, the bandwidth required to forward every stream to all participants grows quadratically. Moreover, additional video streams may exceed a processing capability of a single media server. In these scenarios, a hierarchy of media servers may be created to balance a workload of processing and/or combining the video streams. However, this hierarchy may increase latency for some participants and degrades the interactivity experience of the communication session.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to improving image quality of a stream of input images.

In one aspect, a method for data stream prioritization by a session controller is provided. Usage data associated with a video communication session is received for one or more client devices of the video communication session. The usage data is based on content within data streams of the video communication session. A first client device of the one or more client devices is identified as having a higher priority level during the video communication session based on the usage data. Instructions are sent to the first client device during the video communication session causing the first client device to improve a quality of a first data stream generated by the first client device for the video communication session.

In another aspect, a method for data stream prioritization by a media server is provided. A plurality of data streams of a video communication session are forwarded to a plurality of client devices of the video communication session. Usage data associated with the video communication session is collected based on the plurality of data streams during the video communication session. The usage data is based on content within the plurality of data streams. The usage data is sent to a session controller of the video communication session during the video communication session. Instructions to improve a quality of an identified stream of the plurality of data streams are received from the session controller during the video communication session. The instructions are based on the usage data. A first process to improve the quality of the identified stream is performed in response to the instructions.

In yet another aspect, a system for data stream prioritization is provided. The system comprises a media server configured to route data streams for a video communication session. The system also comprises a session controller configured to: receive usage data associated with a video communication session for one or more client devices of the video communication session, wherein the usage data is based on content within data streams of the video communication session; identify a first client device of the one or more client devices as having a higher priority level during the video communication session based on the usage data; and send instructions to the first client device during the video communication session causing the first client device to improve a quality of a first data stream generated by the first client device for the video communication session.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 1 shows a block diagram of an example of a system configuration in which a session controller for a communication session among a plurality of client devices may be implemented, according to an example embodiment.

FIGS. 2A, 2B, 2C, and 2D show block diagrams of example data streams between client devices and a media server for a communication session, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a session controller for a communication session among a plurality of client devices. Generally, the client devices are used by a participant or viewer of the communication session, for example, participants in a video conference. However, some participants may not be actively involved in the communication session, while others may be consistently active. In various scenarios, for example, participants may be actively speaking, only watching and listening, present at the client device but not paying attention to the communication session, or absent from the client device (e.g., having walked away from their desk). The session controller is configured to prioritize client devices during the communication session based on usage data for the communication session.

The usage data generally indicates, suggests, or may be used to estimate a level of interactivity of the participant within the communication session. In some aspects, the usage data is metadata associated with the client device, for example, whether a microphone of the client device is muted or unmuted, whether audio output at the client device is muted, and/or whether an application supporting the communication session is in a foreground of a user interface (e.g., a currently active user interface window) or a background of the user interface. In some aspects, the usage data is based on content of the communication session, for example, whether the participant is speaking, has asked a question, and/or is answering a question. The session controller may prioritize a client device by reducing audio and/or video compression levels, increasing allocated bandwidth, reducing latency, etc. Moreover, the session controller may deprioritize a client device in some scenarios (e.g., participant is not speaking or interacting) by, for example, increasing audio and/or video compression levels, reducing allocated bandwidth, and/or increasing latency.

Figure 1:
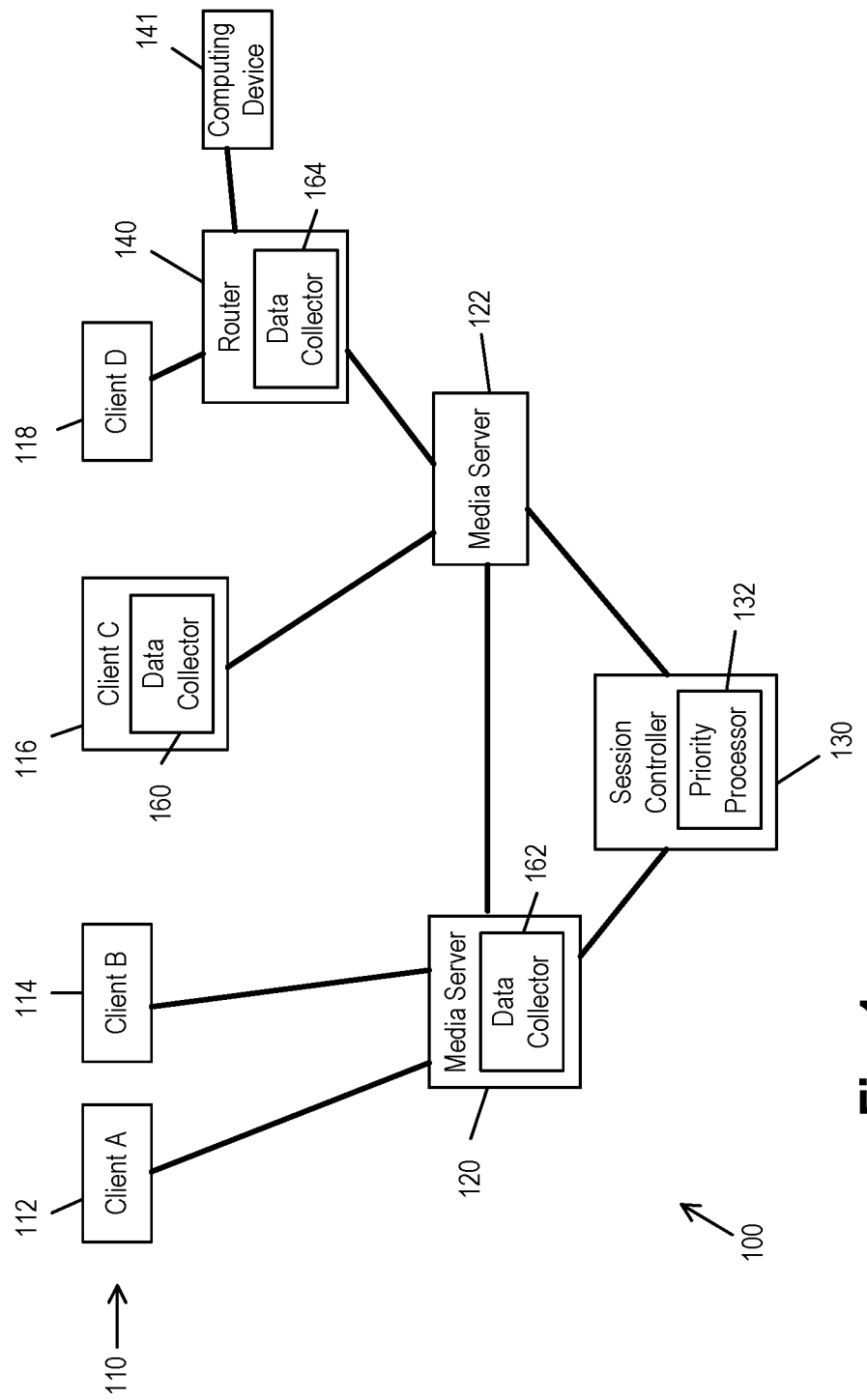

This and many further aspects for a computing device are described herein. For instance, FIG. 1 shows a block diagram of an example of a system configuration 100 in which a session controller 130 for a communication session among a plurality of client devices 110 may be implemented, according to an example embodiment. The communication session may be a teleconference, video conference, online document collaboration session, online gaming session, chat session, or other suitable communication session. In other words, the communication session is shared among the plurality of client devices 110 (e.g., participants of the communication session). Generally, at least some of the plurality of client devices 110 are presenters that transmit one or more data streams (e.g., audio, video, chat, game data, etc.) to other client devices of the plurality of client devices 110, as described below. In contrast to members of a Wi-Fi access point (e.g., members of a same Service Set Identifier), participants in the communication session actively send a data stream to other participants, actively receive data streams from other participants, or both send and receive data streams with other participants where the data streams are for application layer content (e.g., audio for a phone call, video for a video call, etc.).

The communication session may be routed through one or more media servers, such as media servers 120 and 122, as described below. The plurality of client devices 110 are communicatively coupled with the session controller 130 and/or media servers 120 and 122 by communication links (not shown) to form a network, such as a wide area network (WAN), a local area network (LAN), enterprise network, a combination thereof, or other suitable network configuration. The communication links may include one or more of wired and/or wireless portions.

The plurality of client devices 110 comprises a client device 112 ("Client A"), a client device 114 ("Client B"), a client device 116 ("Client C"), and a client device 118 ("Client D"), which may be computing devices having one or more of a user input device (e.g., keyboard, mouse), touch screen display, microphone, display, audio speakers, camera module, etc. The client devices may be personal computers, tablets, smart phones, telephones, network-enabled televisions (or other Internet-of-Things, IoT devices), network-enabled gaming consoles, or other suitable client devices for a communication session, in various embodiments and/or scenarios. In some embodiments, one or more of the plurality of client devices 110 execute a machine-learning process, such as a neural network model (not shown). Example machine learning processes may include determination of whether a participant is speaking (e.g., based on audio recorded from a microphone), determining whether a participant is present (e.g., based on facial recognition), or other suitable processing.

In some embodiments, a client device includes a data collector, such as data collector 160 of the client device 116. The data collector 160 is configured to collect usage data, for example, one or more of diagnostic data, content data, status data, or other suitable data from the client device 116 during a communication session. Although the data collector has been omitted from the client devices 112, 114, and 118 for clarity, any of the plurality of client devices 110 may include a data collector, in other embodiments. The data collector 160 provides the usage data to the session controller 130, which allows the session controller 130 to identify client devices that are active or inactive, etc., as described below.

Diagnostic data may include an identifier of bandwidth (e.g., transfer rate) used by a data stream (e.g., 75 kilobits per second), a codec identifier used for encoding audio or video within a data stream (e.g., H.264, H.265, MPEG-4), a video resolution of a data stream (e.g., 1920×1080), or other suitable diagnostic data. Content data may include a portion of a data stream, for example, several seconds of audio, one or more images from an image data stream, a portion of a text chat, application data, or other suitable content data. In some aspects, usage data based on content includes whether a participant is speaking, has asked a question, and/or is answering a question. In some scenarios, metadata is embedded within data streams of the communication session, for example, as application data with user interface flags indicating whether a microphone is muted or unmuted, whether a "hand" has been raised, etc. Status data may include a connection status for a network interface (e.g., connected or disconnected), a connection status for a messaging application (e.g., online, offline, in a meeting, etc.), a connection status for a telephone, a window size and/or display area size for displaying a data stream, or other suitable status data. In some aspects, the status data is metadata associated with the client device, for example, whether a microphone of the client device is muted or unmuted, whether audio output at the client device is muted, and/or whether an application supporting the communication session is in a foreground of a user interface (e.g., a currently active user interface window) or a background of the user interface.

In some embodiments, the data collector 160 processes the usage data to determine an activity level of a participant within a communication session (e.g., active, inactive, last active two minutes ago, etc.) and provides an identifier corresponding to the activity level to the session controller 130. In these embodiments, the data collector 160 may offload at least some of the processing for determining whether to identify a client device as active or inactive, for example.

In some scenarios, a client device may be located behind a router, modem, or other network device that provides network access to multiple devices. In the example shown in FIG. 1, the client device 118 is located behind a router 140 and the router 140 also provides network access to a computing device 141. The router 140 may be a Wi-Fi router, cable modem, network switch, or other suitable device that separates a local area network from the Internet, a wide area network, or other suitable network. The router 140 may provide a dynamic host configuration protocol and/or network address translation service, for example. In some embodiments, the router 140 may include a data collector 164 that is generally analogous to the data collector 160 and provides usage data related to the client device 118. In some scenarios, the data collector 164 may provide usage data related to a different device, such as computing device 141. The computing device 141 may be a personal computer, tablet, smartphone, or other device that is connected to the router 140. For example, the client device 118 may be a parent's personal computer used for work, while the computing device 141 may be a personal computer used by the parent's child, a smartphone of the parent, a network-enabled television (or other Internet-of-Things, IoT device), a network-enabled gaming console, or other suitable device. Generally, the computing device 141 is not a member of the plurality of client devices 110 connected to the communication session, but bandwidth utilized by the computing device 141 (e.g., from a video streaming app, online game, etc.) may affect a quality of service of the client device 118 because of a shared network connection (e.g., via the router 140). Accordingly, in some scenarios, the router 140 may provide usage data to the session controller 130 and may even provide usage data related to different communication sessions of the computing device 141 (e.g., bandwidth being used, priority level of the different communication session, etc.).

In various embodiments, the communication session may comprise one, two, three, or more data streams for each client device. In one embodiment, for example, each client device of a teleconference may receive a downlink data stream that includes audio data from the other client devices (e.g., combined by a media server). Moreover, each client device of the teleconference may also transmit an uplink data stream that includes audio data from that client device (e.g. to be combined by the media server and transmitted to the other client devices). For example, in a teleconference among clients A, B, C, and D, the client A transmits an uplink data stream that includes audio data from client A and receives a downlink data stream that includes audio data from clients B, C, and D, the client B transmits an uplink data stream that includes audio data from client B and receives a downlink data stream that includes audio data from clients A, C, and D, and so on.

In another embodiment, each client device of a teleconference may receive a separate downlink data stream with audio data from each of the other client devices of the teleconference and also transmit an uplink data stream with its own audio data. For example, in a teleconference among clients A, B, C, and D, the client A transmits an uplink data stream that includes audio data from client A and receives three separate downlink data streams that include audio data from clients B, C, and D, the client B transmits an uplink data stream that includes audio data from client B and receives three separate downlink data streams that include audio data from clients A, C, and D, and so on.

A communication session may comprise more than one type of data stream. For example, while a teleconference may only include audio data streams, a video conference may include an image data stream and an audio data stream. In some aspects, a communication session may include audio data streams, audio data streams and image data streams (e.g., as separate streams), audio data and image data as a single data stream (e.g., as a video with sound), or other suitable combinations of data streams. The data streams may also include text data streams (e.g., for a chat window), a file data stream (e.g., for a file sharing capability), an application data stream (e.g., for a video game, collaborative editing software), or other suitable data streams. In some embodiments, a client device receives multiple data streams for a communication session, such as separate image data streams for the other client devices, but the image data streams are separate only at an application level and are transmitted to the client device within a single stream at a transport level (e.g., at a transmission control protocol/Internet protocol layer).

In some embodiments and/or scenarios, a client device may provide only a subset of data streams that are utilized within a communication session. For example, during a video conference, the client device 114 may not provide an image data stream when its camera is disabled or turned off by a participant, or the client device 112 may not provide an audio data stream when its microphone has been muted by a participant. In some scenarios, at least some of the client devices 112, 114, 116, and 118 receive a control signal from the session controller 130 that causes the client devices to start, stop, and/or change one or more data streams during the communication session, for example, as client devices are newly connected, disconnected, prioritized, and/or deprioritized during the communication session, as described below.

In some aspects, the communication session is hosted and/or managed by one or more media servers, for example, media server 120 and media server 122. Examples of the media server 120 and/or 122 include network servers, application servers, cloud servers, or other suitable computing devices. Generally, the media servers are configured to receive data streams from client devices and forward the data streams to other client devices. In some scenarios, a media server may receive a data stream from a client device via another media server. In other scenarios, a media server may send a data stream to a client device via another media server. As an example using the system configuration 100 shown in FIG. 1, the media server 120 may receive a first data stream from client device 112 and receive a second data stream from the client device 114. The media server 120 may also transmit one or more data streams to the client device 112, one or more data streams to the client device 114, and one or more data streams to the media server 122 (e.g., to reach the client device 116 and client device 118). The media servers may include a data collector, such as the data collector 162 of the media server 120. The data collector 162 is generally analogous to the data collector 160 and provides usage data related to the client device 112 and the client device 114, for example.

In some aspects, the media server 120 and/or media server 122 are configured to combine and/or divide data streams. For example, the media server 122 may combine data streams from the client device 116 and the client device 118 into a single stream that is transmitted to the media server 120. The media server 120 may then combine the single stream (with data streams from client device 116 and 118) with a data stream from the client device 112 and transmit the combined data stream to the client device 114, for example.

The media server 120 and/or media server 122 may be configured to perform one or more processes on at least some of the data streams, for example, to change image quality (e.g., image resolution, color depth, bit rate, compression ratio, codec, image enhancement algorithms, etc.), change audio quality (e.g., bit rate, compression ratio, codec, noise cancellation, echo cancellation, etc.), or change other suitable characteristics of the data streams. As one example, the media server 120 may increase image resolution and add image enhancement algorithm processing to an image data stream from the client device 112. As another example, the media server 122 may reduce a bit rate and stop echo cancellation for an audio data stream from the client device 116. In other words, the media servers 120 and 122 may increase quality and/or decrease quality for various data streams. Moreover, the media servers 120 and 122 may change the characteristics of the data streams during a communication session, as described herein. In some scenarios, the media server 120 and/or 122 (or a different media server) receive one or more control signals from the session controller 130 that cause the media servers 120 and/or 122 to start, stop, and/or change one or more data streams during the communication session, for example, as client devices are newly connected, disconnected, prioritized, and/or deprioritized during the communication session, as described below.

In some aspects, processing on the data streams and even data streams themselves may be divided among two or more media servers for a communication session. As one example, a first media server may handle audio data streams while a second media server may handle image data streams for a communication session (e.g., separate media servers handling the data streams in parallel). As another example, two or more media servers may be connected in series where a first media server performs processing on an audio data stream and performs a pass-through of an image data stream (e.g., forwarding the stream without further processing), while a second media server that receives the processed audio data stream and the image data stream performs image quality enhancement on the image data stream before transmitting the processed audio data stream and enhanced image data stream to a client device (or another media server).

The session controller 130 is a computing device, such as a network server, application server, cloud server, or other suitable computing device. In some scenarios, the session controller 130 is combined with the media server 120 and/or media server 122 (e.g., implemented or co-hosted on a same network server). Generally, the session controller 130 is configured to receive usage data associated with a communication session for the plurality of client devices 110, identify an active or higher priority client device based on the usage data, and send instructions to a data stream handler to cause the data stream handler to improve a quality of a data stream for the client device.

In some scenarios, the session controller 130 may receive usage data from each of the plurality of client devices 110. However, in other scenarios, the session controller 130 may receive usage data from one or more of the plurality of client devices 110 (e.g., a subset of the plurality). In other words, one or more of the plurality of client devices 110 do not provide usage data to the session controller 130. In one such scenario, usage data for those client devices may be provided by a media server or other client devices of the plurality of client devices 110. For example, where a first client device does not directly provide usage data to the session controller 130 but transmits a data stream to a second client device, the second client device may provide usage data associated with the first client device to the session controller 130 based on the data stream transmitted by the first client device. In another such scenario, usage data for some client devices is not available and those client devices are not prioritized, deprioritized, or identified as higher or lower priority, etc. In yet another scenario, usage data for those client devices is not available and the client devices are always prioritized, set to a default prioritization level, or not deprioritized relative to other client devices.

In some aspects, the session controller 130 is configured to identify an inactive client device (or client device having a lower priority level) based on the usage data and send instructions (e.g., a deprioritization control signal) to a data stream handler to cause the data stream handler to lower a quality level (e.g., deprioritize) of the data stream for the inactive client device. In various scenarios, the data stream handler may be a client device that originates the data stream and/or a media server that routes the data stream to or from a client device. For example, data stream handlers for a data stream sent from the client device 112 comprise the client device 112 which originates the data stream, the media server 120 which routes the data stream to the client device 114 and the media server 122, and the media server 122 which routes the data stream to the client device 116 and the client device 118. In some scenarios, the data stream handler may be the router 140 or another suitable network device.

In various aspects, the session controller 130 is configured to identify active client devices and/or inactive client devices, or client devices having lower or higher priority levels, at different times of the communication session, for example, as client devices are newly connected and/or as existing client devices of the communication session are disconnected, prioritized, and/or deprioritized during the communication session, or as updated usage data is received. In some scenarios, prioritizing a first client device is performed along with deprioritizing a second client device. For example, where a communication session has a maximum number of 50 active client stations out of a total of 1000 client stations of the communication session (e.g., due to performance limitations of bandwidth, media server availability, etc.), the session controller 130 may prioritize an active client device corresponding to a participant that is answering a question and deprioritize an inactive client device corresponding to a participant that previously asked the question (or another inactive client device) to maintain the maximum number of active client stations.

The instructions, such as the prioritization control signal and/or the deprioritization control signal, are generated by the session controller 130 and configured to cause the data stream handler to prioritize or improve a quality of a first data stream and/or deprioritize or reduce a quality of a second data stream. The instructions may be transmitted using a dedicated management packet, in some scenarios. In other scenarios, the instructions may be transmitted within a data packet of a data stream, for example, in a header of the data packet of the data stream. In various embodiments, the prioritization control signal and/or deprioritization control signal may be flags, for example, true/false or 0/1 that indicate whether to enable or disable a feature, bit patterns that indicate an identifier for a compression ratio to be used, or other suitable messages that indicate a change in quality characteristics of the data stream.

In various scenarios, the data stream handler may improve a quality of, or prioritize, a data stream by reducing audio and/or video compression levels, increasing allocated bandwidth, reducing latency (e.g., by re-routing a data stream for upstream and/or downstream through a different media server), using a higher quality of service level, increasing image quality enhancement levels of an image processor, etc. In other scenarios, the session controller 130 may reduce a quality of, or deprioritize, a data stream in some scenarios (e.g., participant is not speaking or interacting) by, for example, increasing audio and/or video compression levels, reducing allocated bandwidth, and/or increasing latency. In still other scenarios, the instructions are generated by the session controller 130 and configured to improve data access priority for shared resources, for example, for electronic documents in an online document collaboration environment. Improved data access priority may correspond to granting or denying a participant having priority for edits or overwrite capability, granting or denying access to files locked by other participants, etc.

Prioritization and deprioritization may correspond to two, three, or more different priority levels, in various embodiments. As one example with two priority levels, client devices may be identified as being active or inactive, or high priority or low priority. As other examples with three priority levels, client devices may be identified as having low activity, medium activity, and high activity, or low activity, default activity, and high activity. In other scenarios, the session controller 130 uses a scale for priority levels, for example, corresponding to integer values of 1 to 10 for lowest priority to highest priority. In some scenarios, the session controller 130 ranks each of the plurality of client devices 110 and identifies a top 5 client devices, top 10 client devices, top 10% of client devices, or other suitable group of client devices as having a higher priority level.

In some scenarios, such as in the context of an online game played on a personal computer, smartphone, or gaming console, prioritization and/or deprioritization may be based on a user's interactivity level (e.g., prioritized when actively engaged in a battle and deprioritized when viewing a cut-scene) and/or level of play (e.g., prioritized on an advanced or more difficult level and deprioritized on an early or low difficulty level).

The session controller 130 comprises a priority processor 132 configured to identify active clients and inactive clients (or higher/lower priority) based on usage data. As described above, the usage data may be collected by one or more of data collectors within client devices (e.g., data collector 160), data collectors within media servers (e.g., data collector 162), and/or data collectors within other devices (e.g., data collector 164). The data collectors 160, 162, and 164 may be implemented as one or more of a client application or portion thereof (e.g., an application that supports the communication session), an operating system module, firmware (e.g., camera module firmware, network module firmware), integrated circuit, etc. in various embodiments.

In some embodiments, the usage data is based on content within a data stream. For example, the priority processor 132 and/or the data collectors 160, 162, and/or 164 may process sound within an audio data stream to determine whether a participant that uses a client device is active or inactive, or determine an activity level of the participant. In various aspects, the priority processor 132 identifies an active client device based on conversational dynamics within the communication session, for example, when the participant is speaking, asking a question, answering a question, etc.

In some scenarios, the session controller 130 prioritizes a data stream from a client device when a participant of the client device is speaking and/or deprioritizes the data stream when the participant is not speaking. The priority processor 132 may determine when a participant is speaking or not speaking based upon a mute status of a microphone of the corresponding client device (e.g., muted corresponding to not speaking, etc.). In some scenarios, the priority processor 132 may analyze a portion of audio from an audio data stream to determine whether the participant is speaking, for example, by performing voice analysis against background noise, voice matching with a prior audio sample of the participant, etc. The session controller 130 may monitor audio data streams from a client device and track a time at which the participant last spoke (e.g., 5 seconds ago, 2 minutes ago, etc.) and determine that the participant is inactive when that time exceeds a predetermined threshold (e.g., 5 minutes).

The session controller 130 may prioritize a data stream from a client device when a participant of the client device is asking a question, in various embodiments. Since questions are often spoken with a raised inflection (e.g., rising pitch) at an end of the question, the priority processor 132 may be configured to identify an asked question when a raised inflection followed by a brief pause is detected during an audio data stream. In some scenarios, the priority processor 132 identifies an asked question when a user interface control corresponding to a "hand raise" has been pressed by a participant and the participant is then given an opportunity to speak. The session controller 130 may also prioritize a data stream from a client device when a participant of the client device is answering a question, for example, when speaking after a question has been asked.

In some aspects, the usage data is based on metadata associated with a data stream. For example, the session controller 130 may determine whether a participant is present at a client device and prioritize data streams associated with the client device when the participant is present, while deprioritizing those data streams when the participant is not present (e.g., having left the room or area near the client device). In some examples, the session controller 130 determines whether the participant is present using facial recognition and/or body detection (e.g., the user is present when a face is detected). In other examples, the session controller 130 determines whether the participant is present based on an audio status of the client device (e.g., when a headset or speakers are turned off, the participant is not present). In some scenarios, the session controller 130 detects an intermission (e.g., a break point during a long presentation or seminar) when a plurality of client devices have changed to a "not present" status within a short time period (e.g., within 2 minutes) and avoids changing the active status of the client devices during the intermission.

The session controller 130 may determine whether a participant at a client device is paying attention to (e.g., observing), a display of the client device and prioritize data streams associated with the client device when the participant is paying attention, while deprioritizing those data streams when the participant is not paying attention. The session controller 130 may determine that the participant is paying attention when they are looking at the display (e.g., using facial recognition and/or foveal detection on an image from a camera module), when display windows associated with the communication session are in a foreground of a user interface (e.g., a currently active user interface window), and/or when keyboard and/or mouse activity is detected (e.g., detecting keystrokes, mouse button presses, mouse-related events such as "mouse over", audio that includes keyboard or mouse clicks). In some scenarios, the session controller 130 may determine that a participant is not paying attention when a face is not detected, and/or when keyboard and/or mouse activity has not been detected within a predetermined threshold (e.g., 2 minutes).

In some scenarios, the session controller 130 determines that the participant is not paying attention when other services or applications not associated with the communication session are using a large share of system resources (e.g., memory usage, processor usage, disk drive usage, network bandwidth usage) of the client device that exceed one or more usage thresholds, for example, more than 40% processor usage, more than 200 kbps network bandwidth usage, etc. In some scenarios, the usage thresholds correspond to typical usage for video streaming applications, which may suggest that the participant is watching a movie instead of the communication session. In other scenarios, the session controller 130 determines that the participant is not paying attention when the session controller 130 receives usage data from another data source (not shown), such as a search engine or network service, that indicates the participant (e.g., through an associated login or credentials) has accessed the search engine or network service during the communication session. In one example, the session controller 130 may determine that a participant is paying attention when a window resolution associated with an application for the communication session is maximized, exceeds a size threshold (e.g., taking up 25% of a total screen area), etc. As another example, the session controller 130 may determine that other participants are paying attention to a participant (e.g., a presenter) when a window resolution associated with the participant is maximized and/or exceeds a size threshold, when the other participants are observing the participant (e.g., through foveal detection), etc.

The session controller 130 may send instructions (e.g., a prioritization control signal and/or deprioritization control signal) to a data stream handler associated with the communication session, as described above. In some scenarios, the session controller 130 sends a deprioritization control signal to a data stream handler and/or application that is not associated with the communication session. As one example, when usage data for a video streaming application (e.g., for watching a movie) on a client device exceeds a usage threshold, the session controller 130 may send a deprioritization control signal to the video streaming application to limit its resource usage so as to not degrade the communication session. As another example, when multiple devices share a network connection, such as the client device 118 and the computing device 141 sharing a network connection via the router 140, the session controller 130 may identify the client device 118 and/or the computing device 141 as active or inactive to save bandwidth on the shared network connection. In other words, when a parent is a participant in a webinar using the client device 118 while their child is a participant in an online learning program using the computing device 141, the session controller 130 may identify the computing device 141 as inactive when the child is not paying attention to the online learning program, which may save bandwidth and improve connection quality on the shared network connection for the webinar on the client device 118.

With the advent of 5G, Multi-access Edge Computing (MEC) with data stream processing has become important to improve performance of cloud services. In MEC, there is a hierarchy of devices and servers. For instance, client devices (e.g., the plurality of client devices 110) may transmit data streams to cell towers. The cell towers relay the data stream to edge servers in on-premises (i.e., "on-prem") edges as uplink data traffic. The on-premises edge servers (e.g., media server 120, media server 122) may process the data streams as described above, forward the data streams to other client devices, and transmit usage data to network servers (e.g., session controller 130) at network edges of a cloud infrastructure.

Due to physical constraints (both dimensional and geographic), the edge servers at the on-premises edges have limited computing power and memory capacity when compared to the cloud servers because the edge servers are geographically distributed at locations proximal to the cell towers. It is cost-prohibitive and/or physically infeasible to install extensive computing resources at the edge servers, for example to identify higher priority or lower priority client devices and send control signals or instructions to reconfigure other edge servers. However, improved latency and quality of experience is provided when using a MEC network configuration by obtaining usage data based on the data streams at the media server 120 (at the on-prem edge) and sending the usage data to the session controller 130 (at the network edge or within the cloud) for identification of higher priority client devices and control signal generation.

FIGS. 2A, 2B, 2C, and 2D show block diagrams of example data streams between client devices 212, 214, 216, and 218 and a media server 220 for a communication session, according to an example embodiment. The client devices 212, 214, 216, and 218 generally correspond to the plurality of client devices 110 and the media server 220 generally corresponds to the media server 120 and/or 122. The communication session is managed by a session controller 230, which generally corresponds to the session controller 130. The communication session comprises first, second, third, and fourth data streams between the media server 220 and the client devices 212, 214, 216, and 218, respectively. Although only four client devices are shown in FIGS. 2A, 2B, 2C, and 2D, additional client devices may be coupled to the communication session in other scenarios.

Figure 2A:
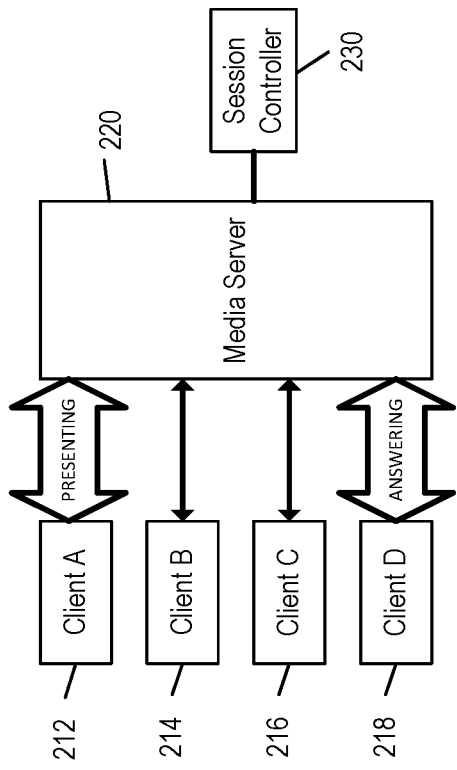

In FIG. 2A, the first data stream between the client device 212 and the media server 220 is prioritized while a participant using the client device 212 is presenting during the communication session. The second data stream is prioritized while a participant using the client device 214 is actively watching the communication session. The third and fourth data streams are not prioritized, or may be deprioritized. In an embodiment, the client device 212 provides usage data that includes a "presenting" flag to the session controller 230 during the communication session. The client device 214 provides usage data that includes facial recognition identifying the participant of the client device 214 while watching the communication session.

Figure 2B:
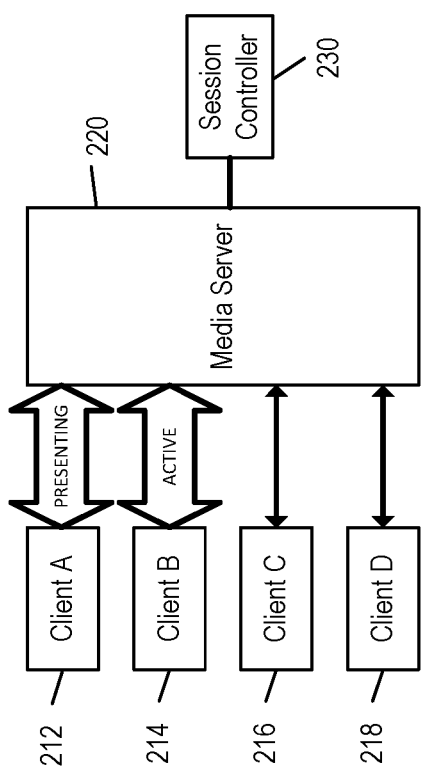

In FIG. 2B, a participant using the client device 216 asks a question during the communication session and the session controller 230 sends a prioritization control signal to the media server 220 and/or the client device 216 to cause a prioritization of the third data stream. In an embodiment, the participant using the client device 216 activates a user interface control corresponding to a "hand raise" and is then given an opportunity to speak (e.g., by a user interface function activated by the presenter or by other participants muting their microphones). The session controller 230 sends the prioritization control signal in response to the hand raise, for example. The session controller 230 may send a deprioritization control signal to the media server 220 and/or the client device 214 to deprioritize the second data stream, for example, to reduce resource utilization on the media server 220 for the communication session.

Figure 2C:
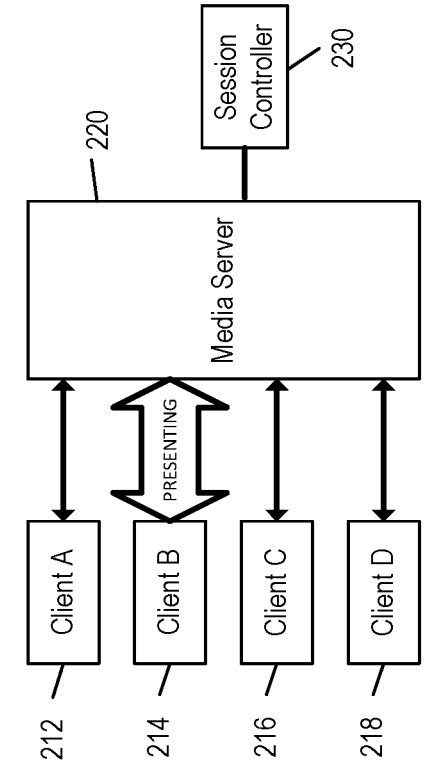

In FIG. 2C, a participant using the client device 218 answers the asked question and the session controller 230 sends a prioritization control signal to the media server 220 and/or the client device 218 to cause a prioritization of the fourth data stream. The session controller 230 also sends a deprioritization control signal to the media server 220 and/or the client device 216 to cause a deprioritization of the third data stream. In an embodiment, for example, the session controller 230 sends the prioritization control signal in response to voice detection on the fourth data stream after the asked question on the third data stream.

Figure 2D:
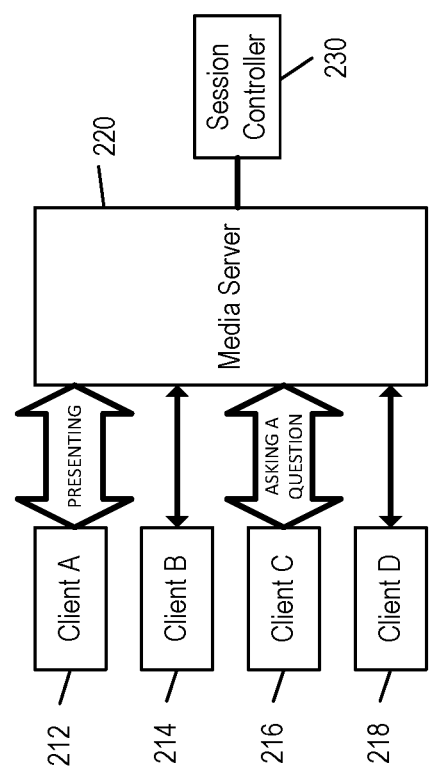

In FIG. 2D, a participant using the client device 214 takes over as a presenter during the communication session and the session controller 230 sends a prioritization control signal to the media server 220 and/or the client device 214 to cause a prioritization of the second data stream. The session controller 230 also sends deprioritization control signals to the media server 220 and/or the client devices 212 and 218 to cause a deprioritization of the first and fourth data streams.

Figure 3:
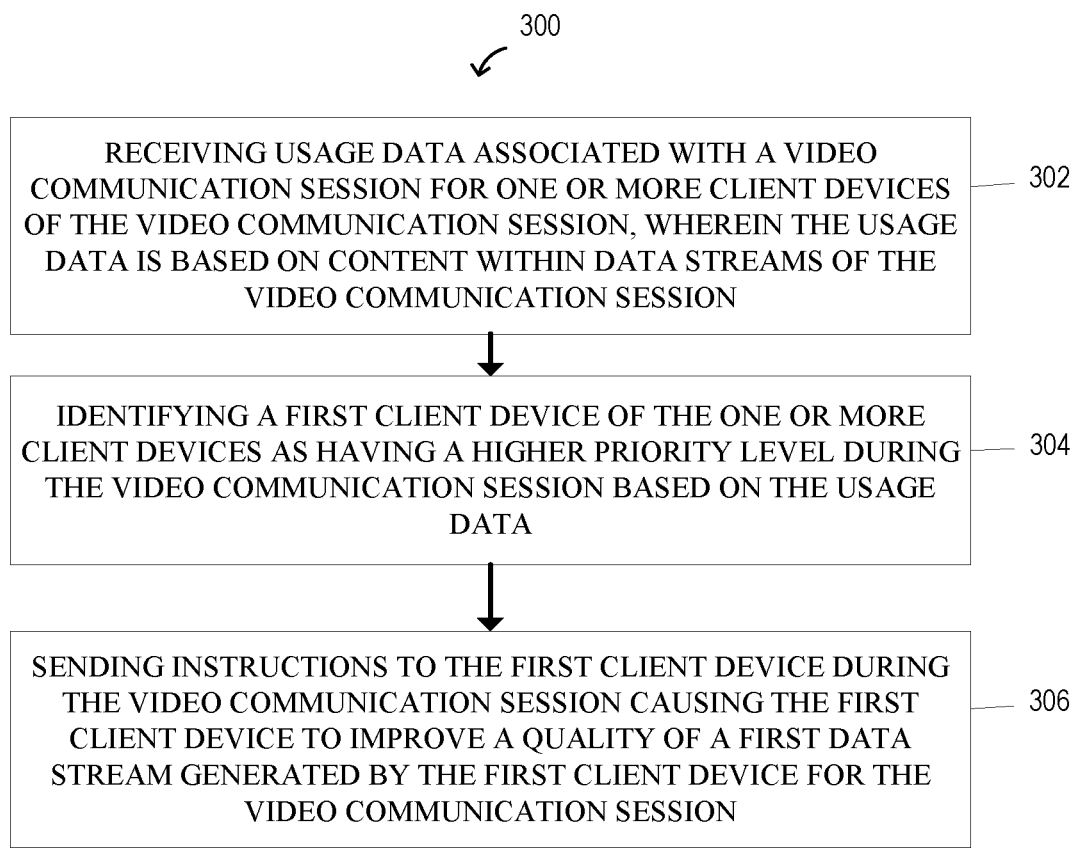
FIG. 3 shows a flowchart of an example method for data stream prioritization, according to an example embodiment.

FIG. 3 shows a flowchart of an example method 300 for data stream prioritization, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 3. Steps may be performed serially, in a partially overlapping manner, or fully in parallel. Thus, the order in which steps of method 300 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 3 may be performed by the session controller 130 (e.g., via the priority processor 132), the media server 120, the session controller 230, the media server 220, or other suitable computing device.

Method 300 begins with step 302. At step 302, usage data associated with a video communication session is received for one or more client devices of the video communication session. The usage data is based on content within data streams of the video communication session and may be received by a session controller for the video communication session. The session controller may correspond to the session controller 130 or the session controller 230, and the one or more client devices may correspond to ones of the plurality of client devices 110 or the client devices 212, 214, 216, and 218.

In some aspects, the usage data is received during the communication session and the usage data indicates a level of interactivity of participants of the communication session (e.g., participants using the plurality of client devices 110). In some embodiments, receiving the usage data comprises monitoring the usage data during the video communication session. For example, the session controller may monitor for a usage threshold to be met during the communication session and dynamically identify client devices as having the higher priority level during the video communication session based on the usage data. Example thresholds may include when more than 50 client devices have joined, when a presenter has stopped presenting, when a question has been asked, when a hand has been raised, etc.

At step 304, a first client device of the one or more client devices is identified as having a higher priority level during the video communication session based on the usage data. In some scenarios, an active client device of the plurality of client devices 110 is identified by the session controller 130 during the communication session based on the usage data. For example, the session controller 130 identifies the client device 212 or 214 (FIG. 2A), the client device 212 or 216 (FIG. 2B), the client device 212 or 218 (FIG. 2C), or the client device 214 (FIG. 2D) as a higher priority client device or active client device.

In various aspects, identifying the first client device as having a higher priority level comprises one or more of determining that a participant of the video communication session using the first client device is actively speaking during the video communication session, determining that a participant of the video communication session using the first client device is asking a question during the video communication session, or determining that a participant of the video communication session using the first client device is answering a question during the video communication session.

In some aspects, the usage data indicates whether a participant of the video communication session is observing an application associated with the video communication session and observing the application corresponds to the higher priority level. The usage data may further indicate whether the participant of the video communication session is interacting with the application associated with the video communication session and interacting with the application corresponds to the higher priority level.

At step 306, instructions are sent to the first client device during the video communication session causing the first client device to improve a quality of a first data stream generated by the first client device for the video communication session. In some scenarios, the instructions include a prioritization control signal sent to a first data stream handler of the first data stream. The first data stream may be one of an upstream data stream or a downstream data stream. In some scenarios, the instructions cause the first client device to improve multiple data streams, such as an uplink data stream and a downlink data stream, or multiple uplink data streams, etc. The prioritization control signal causes the first data stream handler to prioritize the first data stream for the active client device during the communication session. In some embodiments, the session controller 230 sends the instructions to the media server 220 or the client devices 212 and 214 (FIG. 2A), to the media server 220 or the client devices 212 and 216 (FIG. 2B), to the media server 220 or the client devices 212 and 218 (FIG. 2C), or to the media server 220 or the client device 214 (FIG. 2D).

In various aspects, the instructions cause the first client device to perform at least one of reducing audio compression of the first data stream, reducing video compression of the first data stream, increasing image resolution of the first data stream, increasing image color depth of the first data stream, increasing a bit rate of the first data stream, and/or increasing allocated bandwidth for the first client device.

In some embodiments, the method 300 further comprises sending instructions to a media server that routes the first data stream, such as the media server 120 or the media server 122. The instructions cause the media server to perform at least one of reducing audio compression of the first data stream, reducing video compression of the first data stream, increasing image resolution of the first data stream, increasing image color depth of the first data stream, increasing a bit rate of the first data stream, and/or increasing allocated bandwidth for the first client device.

In some aspects, the method 300 further comprises identifying, by the session controller, an inactive client device of the plurality of client devices during the communication session based on the usage data, and sending, by the session controller, a deprioritization control signal to a second data stream handler of a second data stream associated with the inactive client device, wherein the deprioritization control signal causes the second data stream handler to deprioritize the second data stream for the inactive client device during the communication session. For example, the session controller 230 sends the deprioritization control signal to the client device 214 (FIG. 2B), to the client device 216 (FIG. 2C), or to the client devices 212 and 218 (FIG. 2D).

In some aspects, the method 300 further comprises identifying a second client device of the one or more client devices as having a lower priority level during the video communication session based on the usage data. Instructions are sent to the second client device during the video communication session causing the second client device to reduce a quality of a second data stream generated by the second client device for the video communication session. For example, the session controller 230 sends the deprioritization control signal to the client device 214 (FIG. 2B), to the client device 216 (FIG. 2C), or to the client devices 212 and 218 (FIG. 2D). In some scenarios, the lower priority level is relative to a current priority level. For example, where a current priority level is a high priority level, the lower priority level may be a regular priority level, a default priority level, or a low priority level.

In some scenarios, the method 300 further comprises identifying the first client device as having one of a lower priority level or a default priority level at a later time during the video communication session based on the usage data, and sending instructions to the first client device during the video communication session causing the first client device to reduce the quality of the first data stream. In other words, after first raising a priority level of the first client device, the session controller later reduces the priority level of the first client device, for example, if the first client device starts presenting and later stops presenting.

Figure 4:
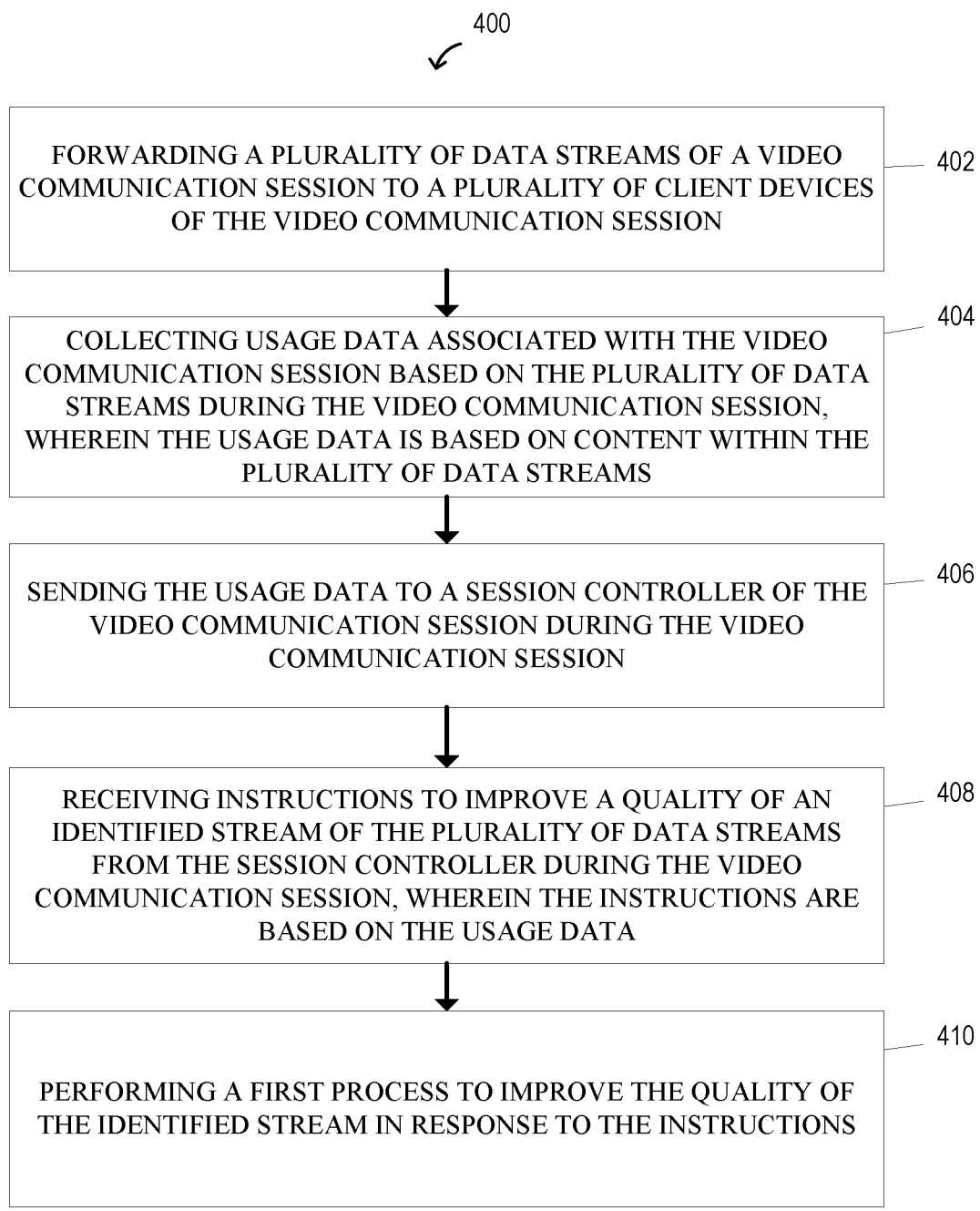
FIG. 4 shows a flowchart of another example method for data stream prioritization, according to an example embodiment.

FIG. 4 shows a flowchart of an example method 400 for data stream prioritization, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 4. Steps may be performed serially, in a partially overlapping manner, or fully in parallel. Thus, the order in which steps of method 400 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the media server 120, the media server 220, or other suitable computing device.

Method 400 begins with step 402. At step 402, a plurality of data streams of a video communication session are forwarded by a media server to a plurality of client devices of the video communication session. In some embodiments, the media server generally corresponds to the media server 120 and/or the media server 220.

At step 404, usage data associated with the video communication session is collected based on the plurality of data streams during the video communication session. The usage data is based on content within the plurality of data streams. In some aspects, the usage data indicates a level of interactivity of participants of the video communication session that utilize the plurality of client devices.

At step 406, the usage data is sent to a session controller of the video communication session during the video communication session. In some embodiments, the session controller corresponds to the session controller 130 and/or the session controller 230.

At step 408, instructions to improve a quality of an identified stream of the plurality of data streams are received from the session controller during the video communication session. The instructions are based on the usage data and, in some aspects, may include a prioritization control signal for the identified stream.

At step 410, a first process to improve the quality of the identified stream is performed in response to the instructions. The first process is configured to prioritize the identified stream among the plurality of data streams in response to the instructions or prioritization control signal. Performing the first process may comprise at least one of reducing audio compression of the identified data stream, reducing video compression of the identified data stream, increasing image resolution of the identified data stream, increasing image color depth of the identified data stream, increasing a bit rate of the identified data stream, and/or increasing allocated bandwidth for a client device of the plurality of client devices that corresponds to the identified data stream.

In some aspects, the identified stream is a first identified stream and the instructions are first instructions and the method 300 further comprises receiving second instructions to reduce a quality of a second identified stream of the plurality of data streams from the session controller during the video communication session, and performing a second process to reduce the quality of the second identified stream in response to the instructions.

In some aspects, the method 300 further includes analyzing at least some content of the plurality of data streams to obtain the usage data. For example, the data collector 162 may analyze audio, speech, images, and/or application data to obtain the usage data.

Figure 5:
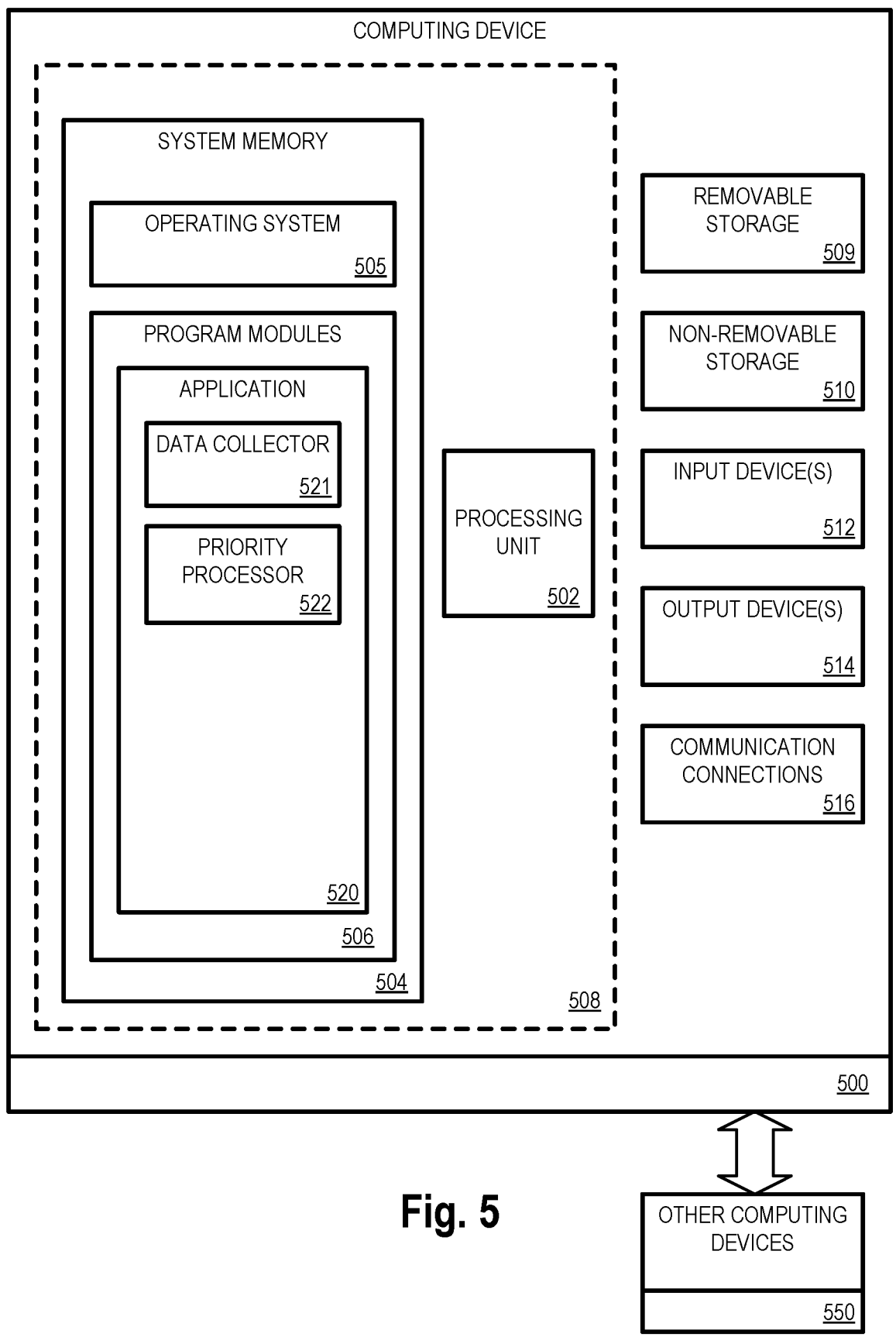
FIG. 5 is a block diagram illustrating example physical components of a computing device with which aspects of the disclosure may be practiced.
Figure 6:
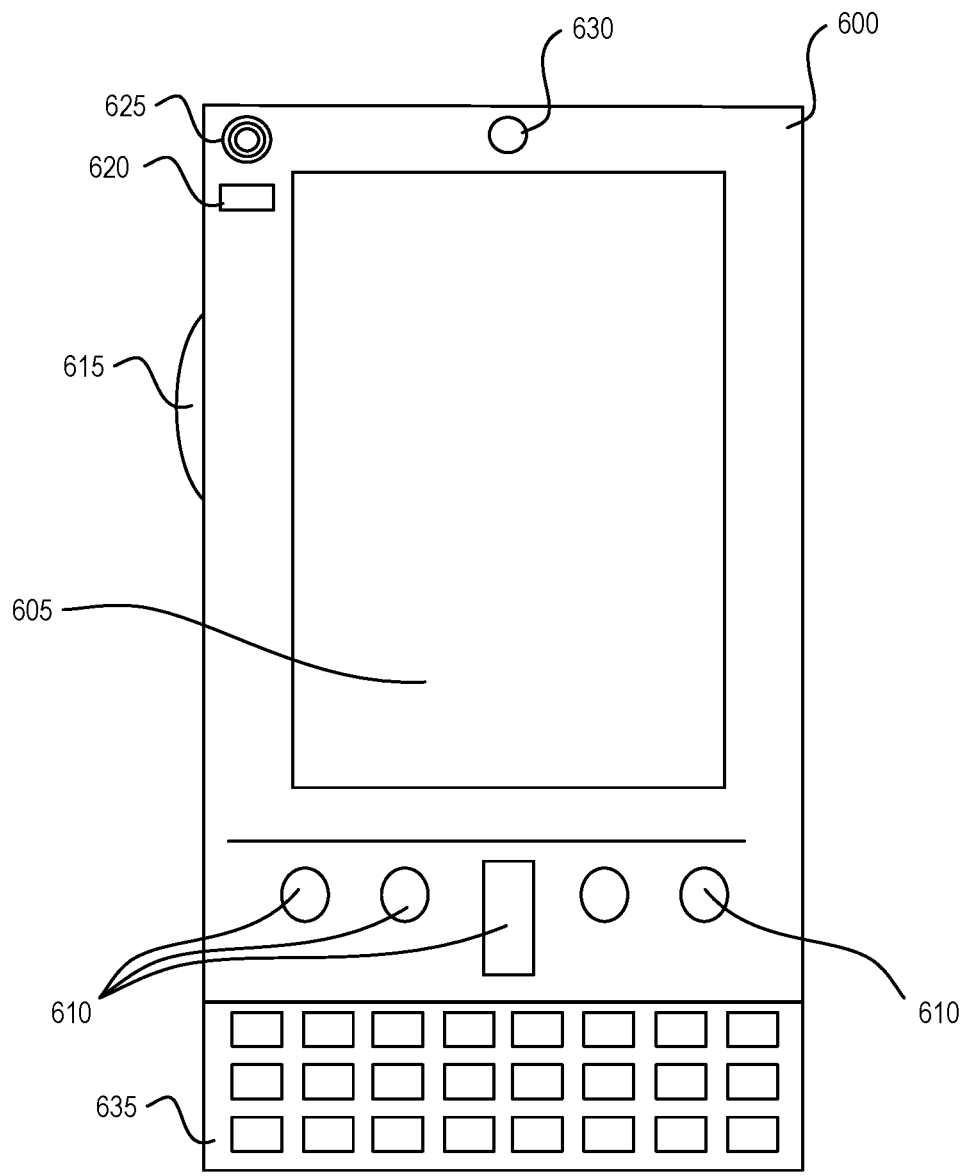
FIGS. 6 and 7 are simplified block diagrams of a mobile computing device with which aspects of the present disclosure may be practiced.
Figure 7:
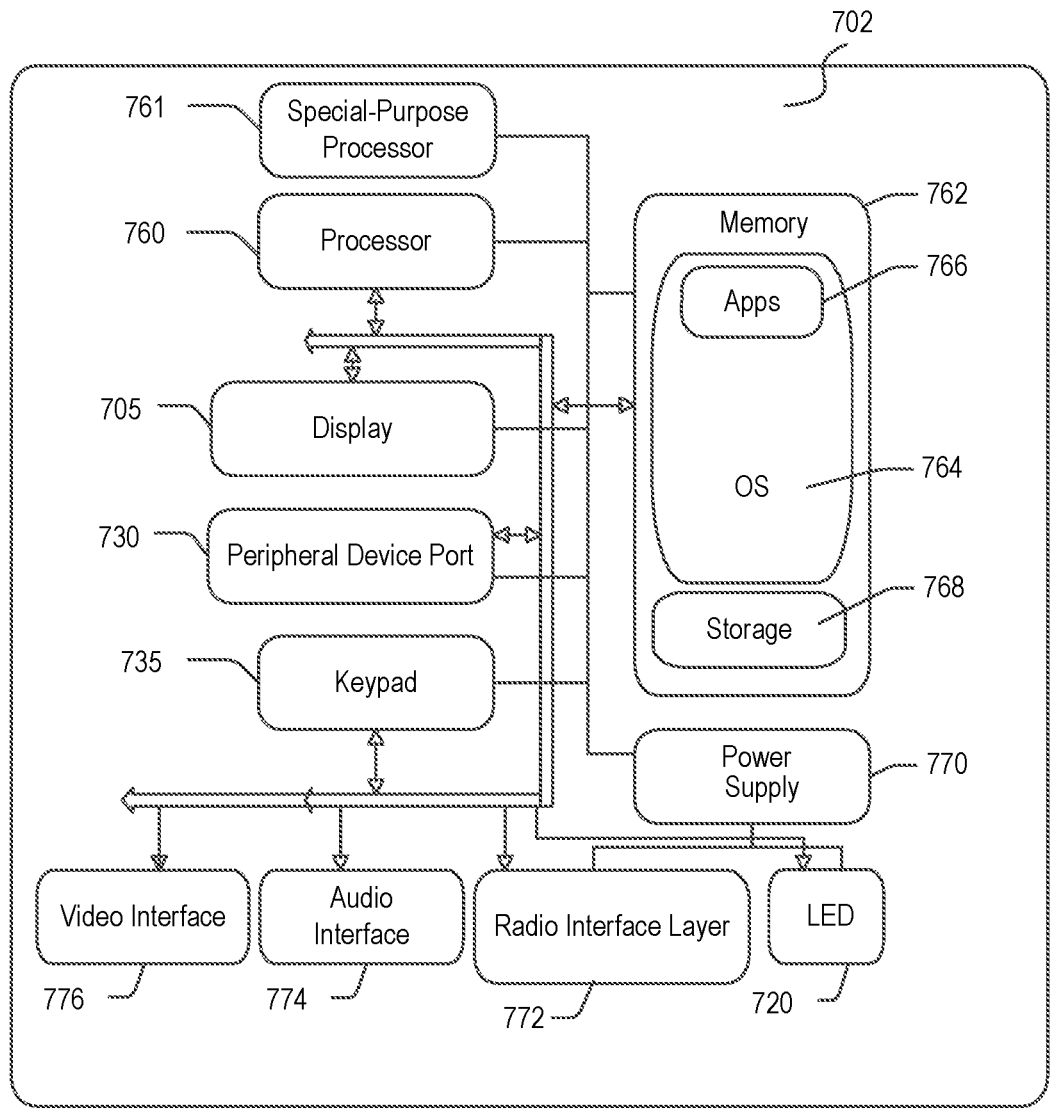

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, as described herein.

FIG. 5 is a block diagram illustrating physical components (e.g., hardware) of a computing device 500 with which aspects of the disclosure may be practiced. The computing device components described below may have computer executable instructions for implementing a data stream processor application 520 on a computing device (e.g., session controller 130, session controller 230, media server 120, media server 122), including computer executable instructions for data stream processor application 520 that can be executed to implement the methods disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running data stream processor application 520, such as one or more components with regard to FIGS. 1 and 2 and, in particular, data collector 521 (e.g., corresponding to data collectors 160, 162, 164), and priority processor 522 (e.g., corresponding to priority processor 132).

The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., data stream processor application 520) may perform processes including, but not limited to, the aspects, as described herein. Other program modules that may be used in accordance with aspects of the present disclosure, and in particular for prioritizing data streams, may include data collector 521 and priority processor 522.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6 and 7 illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 600 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer.

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 625 (e.g., audio transducer 625 illustrated in FIG. 6). In the illustrated embodiment, the visual indicator 720 is a light emitting diode (LED) and the audio transducer 625 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like.

A mobile computing device 600 implementing the system 702 may have additional features or functionality. For example, the mobile computing device 600 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 600 and stored via the system 702 may be stored locally on the mobile computing device 600, as described above, or the data may be stored on any number of storage media that may be accessed by the device via the radio interface layer 772 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 6 and 7 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for data stream prioritization by a session controller, the method comprising:
   receiving usage data associated with a video communication session for one or more client devices of the video communication session, wherein the usage data is based on content within data streams of the video communication session;
   identifying a first client device of the one or more client devices as having a higher priority level during the video communication session based on the usage data; and
   sending instructions to the first client device during the video communication session causing the first client device to improve a quality of a first data stream generated by the first client device for the video communication session,
   wherein the usage data indicates whether a participant of the video communication session is observing an application associated with the video communication session, and wherein the participant observing the application corresponds to the higher priority level.

2. The method of claim 1, wherein receiving the usage data comprises monitoring the usage data during the video communication session;
    the method further comprising dynamically identifying client devices of the one or more client devices as having the higher priority level during the video communication session based on the usage data.

3. The method of claim 2, wherein the usage data indicates a level of interactivity of participants of the video communication session that utilize the one or more client devices.

4. The method of claim 1, the method further comprising:
    identifying a second client device of the one or more client devices as having a lower priority level during the video communication session based on the usage data; and
    sending instructions to the second client device during the video communication session causing the second client device to reduce a quality of a second data stream generated by the second client device for the video communication session.

5. The method of claim 1, the method further comprising:
    identifying the first client device as having one of a lower priority level or a default priority level at a later time during the video communication session based on the usage data; and
    sending instructions to the first client device during the video communication session causing the first client device to reduce the quality of the first data stream.

6. The method of claim 1, wherein the first data stream is one of an upstream data stream or a downstream data stream.

7. The method of claim 1, wherein identifying the first client device as having a higher priority level comprises determining that a participant of the video communication session using the first client device is actively speaking during the video communication session.

8. The method of claim 1, wherein identifying the first client device as having a higher priority level comprises determining that a participant of the video communication session using the first client device is asking a question during the video communication session.

9. The method of claim 1, wherein identifying the first client device as having a higher priority level comprises determining that a participant of the video communication session using the first client device is answering a question during the video communication session.

10. The method of claim 1, wherein the usage data indicates whether the participant of the video communication session is interacting with the application associated with the video communication session and interacting with the application corresponds to the higher priority level.

11. The method of claim 1, wherein the instructions cause the first client device to perform at least one of reducing audio compression of the first data stream, reducing video compression of the first data stream, increasing image resolution of the first data stream, increasing image color depth of the first data stream, increasing a bit rate of the first data stream, and/or increasing allocated bandwidth for the first client device.

12. The method of claim 11, the method further comprising sending instructions to a media server that routes the first data stream, wherein the instructions cause the media server to perform at least one of reducing audio compression of the first data stream, reducing video compression of the first data stream, increasing image resolution of the first data stream, increasing image color depth of the first data stream, increasing a bit rate of the first data stream, and/or increasing allocated bandwidth for the first client device.

13. A method for data stream prioritization by a media server, the method comprising:
    forwarding a plurality of data streams of a video communication session to a plurality of client devices of the video communication session;
    collecting usage data associated with the video communication session based on the plurality of data streams during the video communication session, wherein the usage data is based on content within the plurality of data streams;
    sending the usage data to a session controller of the video communication session during the video communication session;
    receiving instructions to improve a quality of an identified stream of the plurality of data streams from the session controller during the video communication session, wherein the instructions are based on the usage data;
    performing a first process to improve the quality of the identified stream in response to the instructions,
    wherein the usage data indicates whether a participant of the video communication session is observing an application associated with the video communication session, and wherein the participant observing the application corresponds to the higher priority level.

14. The method of claim 13, wherein the identified stream is a first identified stream and the instructions are first instructions;
    wherein the method further comprises:
        receiving second instructions to reduce a quality of a second identified stream of the plurality of data streams from the session controller during the video communication session;
        performing a second process to reduce the quality of the second identified stream in response to the instructions.

15. The method of claim 13, wherein performing the first process comprises at least one of reducing audio compression of the identified data stream, reducing video compression of the identified data stream, increasing image resolution of the identified data stream, increasing image color depth of the identified data stream, increasing a bit rate of the identified data stream, and/or increasing allocated bandwidth for a client device of the plurality of client devices that corresponds to the identified data stream.

16. The method of claim 13, wherein the usage data indicates a level of interactivity of participants of the video communication session that utilize the plurality of client devices.

17. The method of claim 13, the method further comprising analyzing at least some content of the plurality of data streams to obtain the usage data.

18. A system for data stream prioritization, the system comprising:
    a media server configured to route data streams for a video communication session;
    a session controller configured to:
        receive usage data associated with a video communication session for one or more client devices of the video communication session, wherein the usage data is based on content within data streams of the video communication session;
        identify a first client device of the one or more client devices as having a higher priority level during the video communication session based on the usage data; and send instructions to the first client device during the video communication session causing the first client device to improve a quality of a first data stream generated by the first client device for the video communication session, wherein the usage data indicates whether a participant of the video communication session is observing an application associated with the video communication session, and wherein the participant observing the application corresponds to the higher priority level.

19. The system of claim 18, wherein:
the usage data indicates a level of interactivity of participants of the video communication session that utilize the plurality of client devices.

* * * * *